US009706069B2

(12) United States Patent
Kowaka et al.

(10) Patent No.: US 9,706,069 B2
(45) Date of Patent: Jul. 11, 2017

(54) ELECTRONIC DEVICE AND OPERATION PROCEDURE INDICATING METHOD (71) Applicant: KYOCERA Document Solutions Inc., Osaka (JP)

(72) Inventors: Makoto Kowaka, Osaka (JP); Yosuke Nakazato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/087,751

(22) Filed: Mar. 31, 2016

(65) Prior Publication Data

US 2016/0295041 A1 Oct. 6, 2016

(30) Foreign Application Priority Data

Mar. 31, 2015 (JP) .................................. 2015-071944

(51) Int. Cl.
H04N 1/00 (2006.01)
(52) U.S. Cl.
CPC ..... H04N 1/00514 (2013.01); H04N 1/00411 (2013.01); H04N 1/00506 (2013.01); H04N 1/00962 (2013.01)
(58) Field of Classification Search
None
See application file for complete search history.

(56) References Cited

U.S. PATENT DOCUMENTS

| 2003/0103165 | A1* | 6/2003 | Bullinger | H04N 5/44543 348/569 |
| 2004/0109030 | A1* | 6/2004 | Farrington | G06F 9/4446 715/808 |
| 2004/0233316 | A1* | 11/2004 | Battles | H04N 1/2112 348/333.02 |
| 2010/0064235 | A1* | 3/2010 | Walls | G05B 23/0267 715/763 |

FOREIGN PATENT DOCUMENTS

JP 2005-172948 A 6/2005

* cited by examiner

Primary Examiner — Thomas D Lee
(74) Attorney, Agent, or Firm — Hawaii Patent Services; Nathaniel K. Fedde; Kenton N. Fedde (57) ABSTRACT

Provided is an electronic device wherein a clocking part measures an adjusting operation time on an initial adjustment screen, a screen display item determination part makes a comparison between a first target value and a measuring result of the clocking part to determine a displaying number of adjusting items, and by doing so, a system control part will cause a panel part as a display part to display screens (detailed adjustment screens) of different displaying numbers of the adjusting items based on the screen display data corresponding to the displaying number of the adjusting items that has been determined by the screen display item determination part.

5 Claims, 6 Drawing Sheets

ELECTRONIC DEVICE AND OPERATION PROCEDURE INDICATING METHOD

INCORPORATION BY REFERENCE

This application is based on and claims the benefit of priority from Japanese Patent Application No. 2015-071944 filed on Mar. 31, 2015, the entire contents of which are hereby incorporated by reference.

BACKGROUND

The present disclosure relates to an electronic device and an operation procedure indicating method both of which are suitable for indicating an operation procedure in association with the electronic device.

Screen operations pursuant to predetermined procedures or the like have been performed in the adjusting operation of electronic parts such as sensors mounted on the control device or the like which is conducted by an operator in the production line and in the maintenance operation of image forming devices which is conducted by a field service engineer. Thus, in such cases, the operator and the field service engineer, regardless of his/her skill, are forced to work by using the same procedures, which results in that for the operator and the field service engineer who are familiar with the work, some process works are futility such as a screen switching associated with the adjusting or maintenance operation. On the other hand, sometimes it is necessary for the operator and the field service engineer who are unfamiliar with the work to the screen switching associated with the adjusting or maintenance operation in order to master the process work.

In such case, an idea may arise that providing different screen switching actions, respectively, to an operator and a field service engineer who are familiar with the work and another operator and another field service engineer who are unfamiliar with the work, depending on their skill will enhance the convenience of process work.

With respect to such screen switching actions, an improvement of enhancement of operability when a display screen of the display part is automatically switched in a typical electronic device has been proposed which is depending on the user's taste or skill.

In this configuration, when a user ID is received by an operation means by an external operation, a control means determines, using a data table, the screen display data corresponding to the user ID. Then, the resulting screen display data is read from a screen display data storage mean and is displayed on the display means.

In the typical electronic device, depending on the user ID, the display screen is automatically switched between a simple screen for an operator or field service engineer who is unfamiliar with the work and a normal screen for an operator or field service engineer who is familiar with the work, thereby enhancing the operability.

For example, on the simple screen, there are displayed frequently uses operation keys, while, on the normal screen, there are displayed all of the setting related operation keys. In addition, previous registration for relating image display data for displaying the simple or normal screen to the user ID will display the display screen depending on the user ID.

SUMMARY

According to an aspect of the present disclosure, an electronic device of the present disclosure includes a screen display data storage circuit, a display circuit, a clocking circuit, a screen display item determination circuit, and a system control circuit. The screen display data storage circuit includes a region in which is stored screen display data for displaying an initial adjustment screen and plural detailed adjustment screens. The plural detailed adjustment screens are different in displaying number of adjusting items each other. The display circuit includes a display panel to display a screen based on the screen display data. The clocking circuit performs measuring an adjusting time on the initial adjustment screen. The screen display item determination circuit performs comparing a first target value to a measuring result of the clocking circuit in order to determine the displaying number of the adjusting items. The system control circuit performs displaying one of the detailed adjustment screens based on the screen display data corresponding to the number of the adjusting items that is determined by the screen display item determination circuit.

In addition, according to another aspect of the present disclosure, a method of displaying an operation procedure which embodies the present disclosure, includes: (i) storing, in a screen display data storage circuit, screen display data for displaying an initial adjustment screen and plural detailed adjustment screens, the plural detailed adjustment screens being different in displaying number of adjusting items each other, (ii) displaying, on a display circuit, a screen based on the screen display data, (iii) measuring, via a clocking circuit, an adjusting time on the initial adjustment screen, (iv) comparing, via a screen display item determination circuit, a first target value to a measuring result of the clocking circuit in order to determine the displaying number of the adjusting items, and (v) displaying, via a system control circuit, one of the detailed adjustment screens based on the screen display data corresponding to the number of the adjusting items that is determined by the screen display item determination circuit.

DETAILED DESCRIPTION

Hereinbelow, with reference to FIGS. 1 to 5, a description is made as to an exemplary embodiment of the present disclosure. It is to be noted that as example of an electronic device, an MFP (Multifunction Peripheral) 10 is available that is a composite peripheral device on which multiple operation functions are mounted that include, for example, copy, print, and FAX (Facsimile) jobs.

Figure 1:
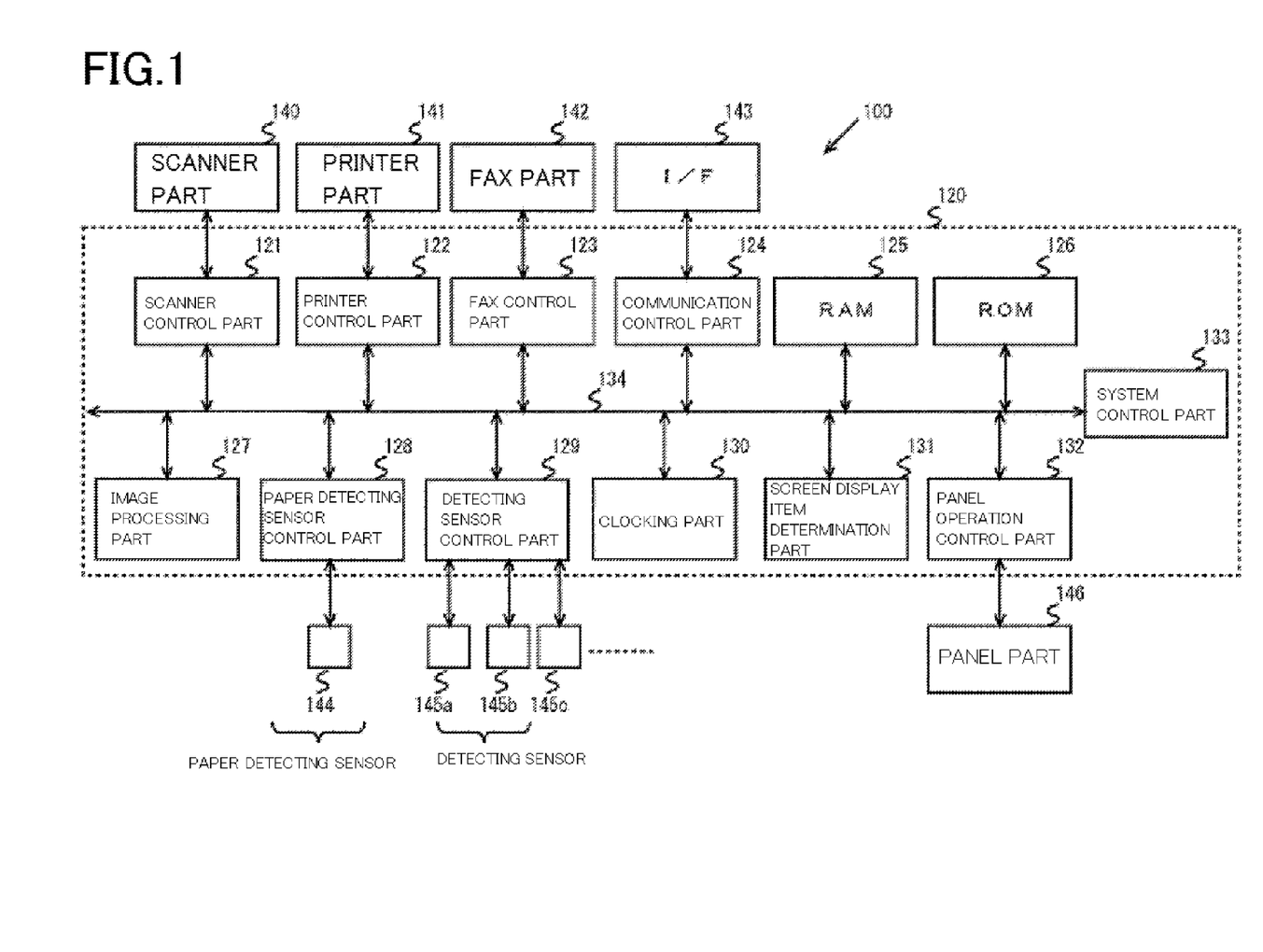
FIG. 1 illustrates an MFP as an image forming device to which an electronic device according to an exemplary embodiment of the present disclosure is applied.

First of all, the MFP 100 includes, for example, a control part 120, a scanner part 140, a printer part 141, a FAX part 142, an I/F (interface) 143, a paper detecting sensor 144, detecting sensors 145a to 145c, and a panel part 146. Each of the parts of the MFP 100 conducts an operation as follows.

The scanner part 140 inputs image data of a manuscript that is read by an image sensor to the control part 120. More specifically, the scanner part 140 converts image signals of the manuscripts into digitalized image data sets and input the resulting the digitalized image data sets, one after another, to the control part 120.

The printer part 141 prints an image on a paper pursuant to the image data set that is outputted from the control part 120. The FAX part 142 transmits the image data set that is outputted from the control part 120, via telephone line, to a mating facsimile, and also receives an image data set from the mating facsimile and inputs the resulting image data set to the control part 120. More specifically, the FAX part 142 compress and modulates, while conducting a continual connection control of the telephone line by using an NCU (Network Control Unit), the image data set that is outputted from the control part 120 and to transmit the resulting image data set to the mating facsimile. On the other hand, the FAX part 142 demodulates and expands, while conducting a continual connection control of the telephone line by using the NCU, the image data set that is transmitted from the mating facsimile and input the resulting image data set to the control part 120.

The I/F 143 communicates with, for example, a client terminal via a network such as an in-house LAN (Local Area Network).

The paper detecting sensor 144 detects a paper accommodated in a paper sheet feed cassette. The detecting sensors 145a to 145c detect a paper sheet that is being conveyed along a conveyer path within a main body of the MFP 100.

The panel part 146 includes, which acts as a display part, a display panel that receives a selection from among printer, FAX, and scan functions of the MFP 100 and also indicates operation buttons for conducting various settings. The panel part 146 also displays a screen that is used, for example, for adjusting the paper detecting sensor 144, the detecting sensors 145a to 145c, and so on, which is detailed later.

The control part 120 controls an operation of the entire MFP 100. The control part 120 includes a scanner control part 121, a printer control part 122, a FAX (Facsimile) control part 123, a communication control part 124, a RAM (Random Access Memory) 125, a ROM (Read Only Memory) 126, an image processing part 127, a paper detecting sensor control part 128, a detecting sensor control part 129, a clocking part 130, a screen display item determination part 131, and a panel operation control part 132. In addition, these are connected to a data bus 134. Each of the scanner control part 121, the printer control part 122, the FAX (Facsimile) control part 123, the communication control part 124, the image processing part 127, the paper detecting sensor control part 128, the detecting sensor control part 129, the clocking part 130, the screen display item determination part 131, and the panel operation control part 132 includes a processor such as a Central Processing Unit (CPU) having one or more circuits which is capable of reading various program to execute and which is also capable of executing previously incorporated various programs. Here, the circuit may be available in the form of an electronic part that is made up of wired plural elements or an electronic substrate.

The scanner control part 121 controls a scanning operation of scanner part 140. The printer control part 122 controls a printing operation of the printer part 141. The FAX control part 123 controls an image data transmitting/receiving operation that is performed by the FAX part 142. The communication control part 124 controls a communication via the I/F 143.

The RAM 125 serves as a work memory that allows a program to be executed. The ROM 126 has a region that stores, for example, a control program checking an operation of each of the parts. The image processing part 127 implements, for example, an image processing of the image data that is scanned by the scanner part 140.

The paper detecting sensor control part 128 controls a paper detection operation that is conducted by the paper detecting sensor 144. The detecting sensor control part 129 controls a paper detection operation that is conducted by each of the detecting sensors 145a to 145c.

The clocking part 130 counts, for example, time that is required for adjusting each of the paper detecting sensor 144, the detecting sensors 145a to 145c, and other equipment. The screen display item determination part 131 detects of display number of adjustment items to be displayed on the panel part 146 based on the clocking result that is provided by the clocking part 130.

The panel operation control part 132 controls a display operation of the panel part 146. The system control part 133 mainly causes the panel operation control part 132 to display the adjustment item on the panel part 146 based on a detection result that is provided by the screen display item determination part 131.

Figure 2:
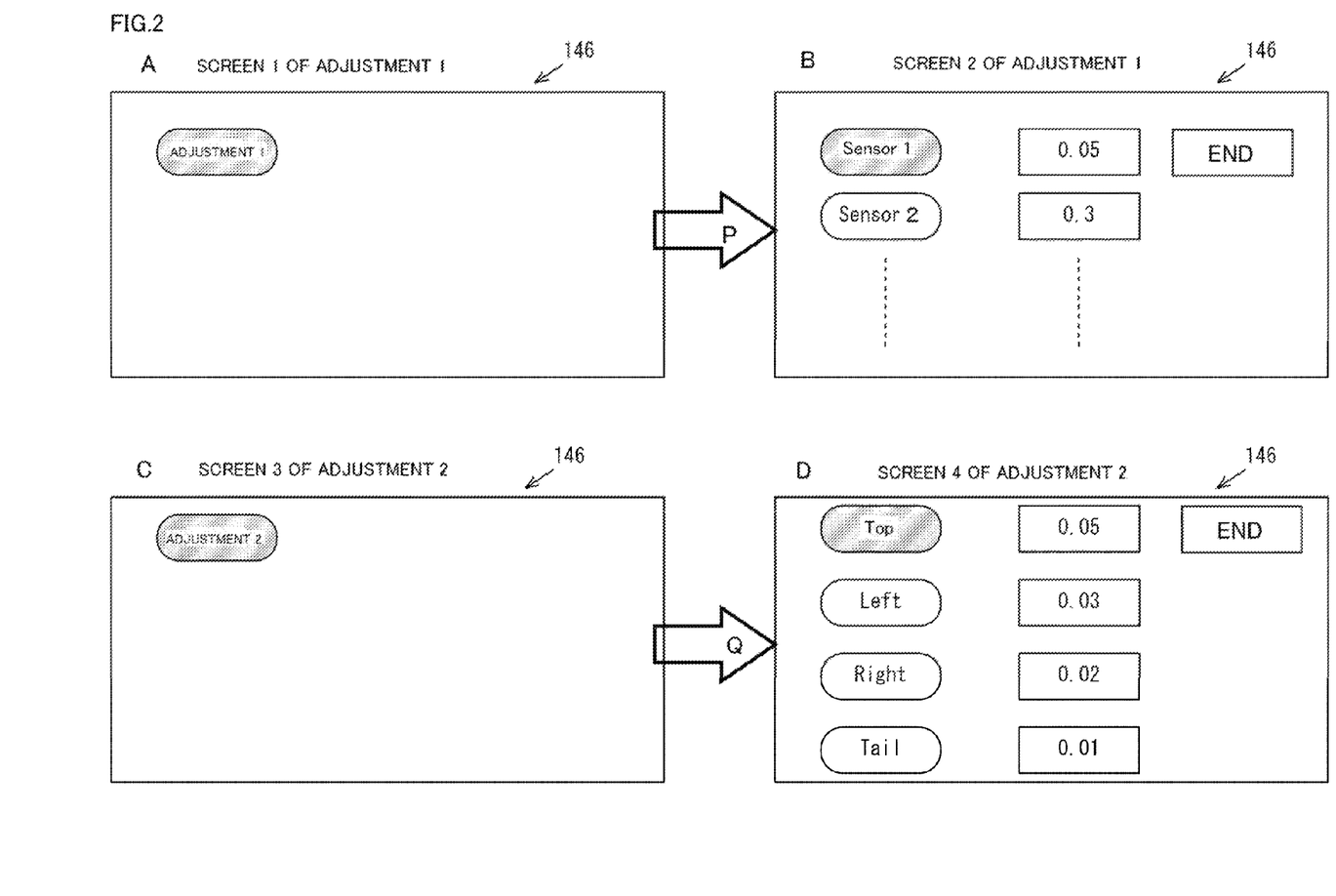
FIG. 2 illustrates at its "A", "B", "C", and "D", respectively, a screen 1 of adjustment 1 (initial adjustment screen), a screen 2 of adjustment 1 (initial adjustment screen), a screen 3 of adjustment (detailed adjustment screen), and a screen 4 of adjustment 2 (detailed adjustment screen).
Figure 3:
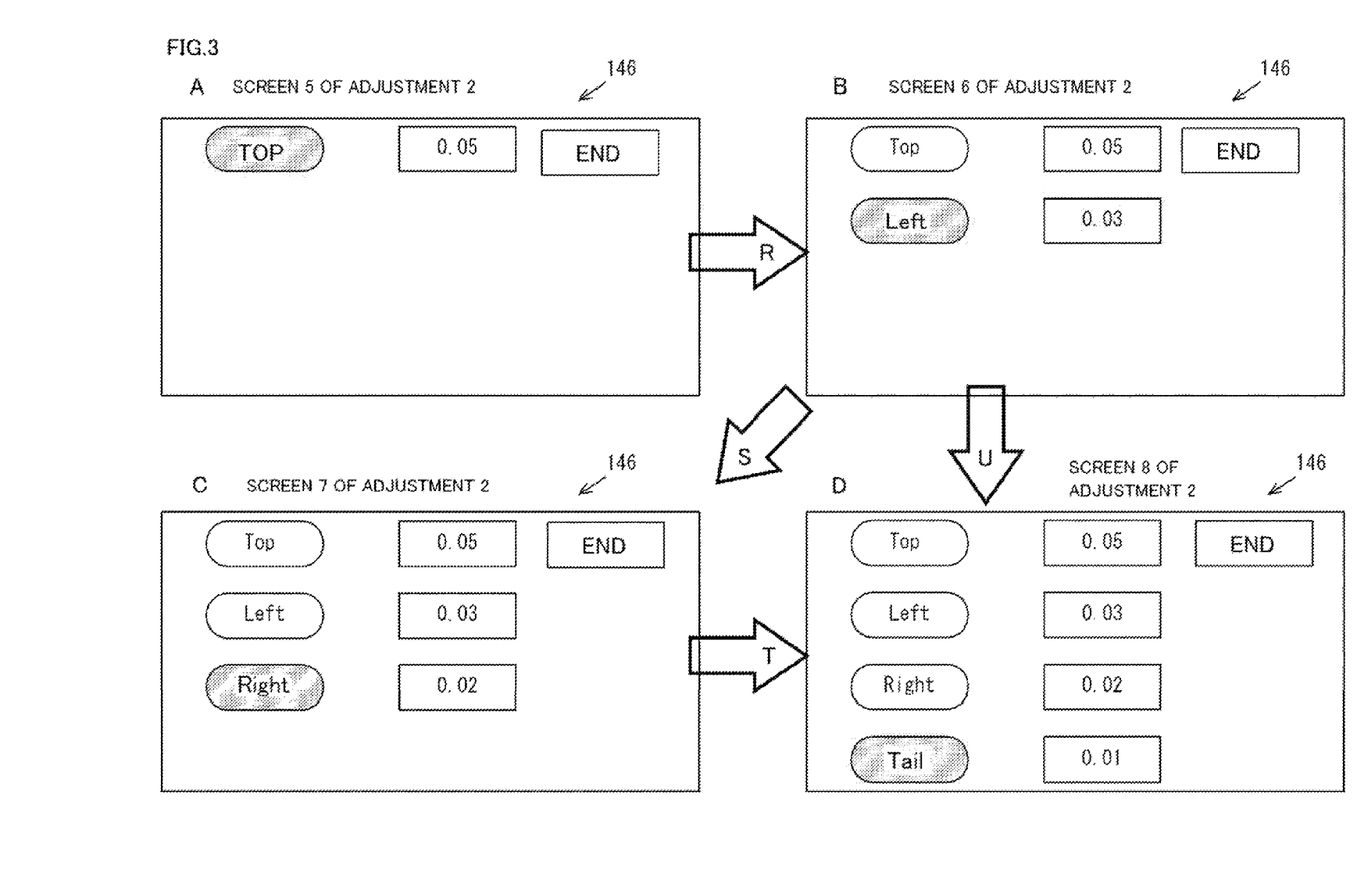
FIG. 3 illustrates at its "A", "B", "C", and "D", respectively, a screen 5 of adjustment 2 (detailed adjustment screen), a screen 6 of adjustment 2 (detailed adjustment screen), a screen 7 of adjustment (detailed adjustment screen), and a screen 8 of adjustment 2 (detailed adjustment screen).
Figure 4:
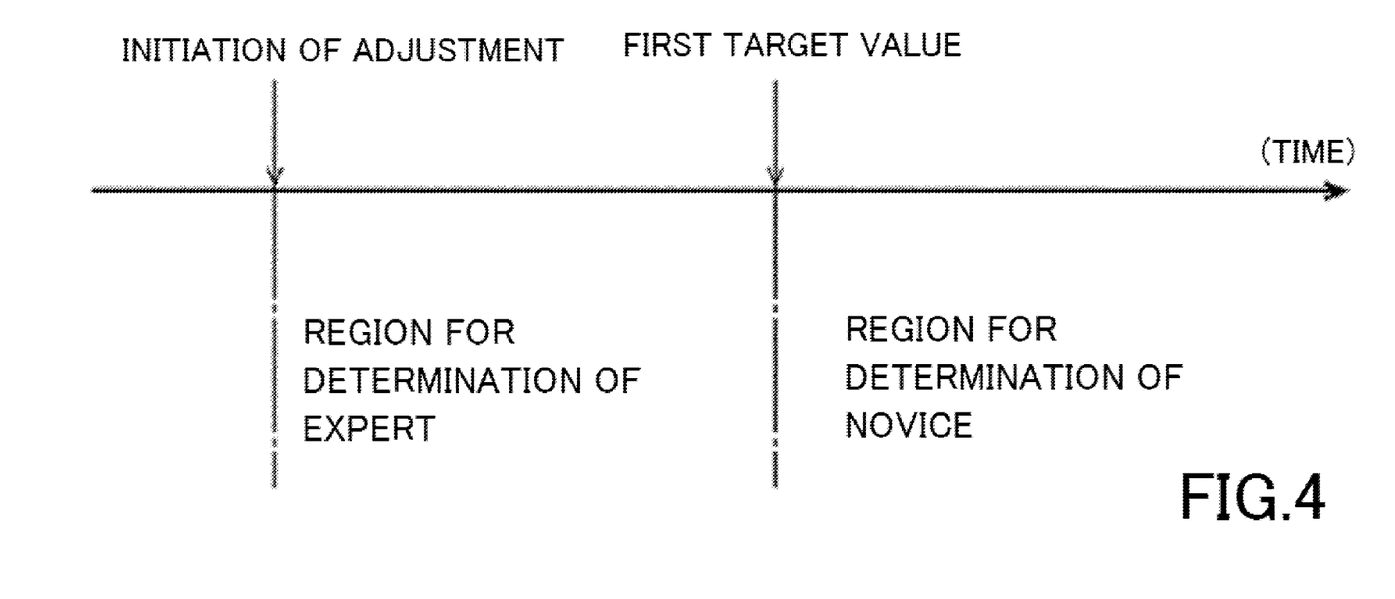
FIG. 4 shows a target value that is to be used when the screen display item determination part shown in FIG. 1 determines whether a person in charge of adjusting operation is an expert or a novice.

Next, with reference to FIGS. 2 to 4, outlines of a screen switching operation is illustrated that is based on determination result that is provided by the screen display item determination part 131. It is to be noted that in FIGS. 2 and 3 that are explained below "A" and "B" in FIG. 2 are indicative of screens for making initial adjustments, and "C" and "D" in FIG. 2 and "A" to "D" in FIG. 4 are indicative of screens for making detailed adjustments.

First of all, as shown in FIG. 4, based on the time required for the adjustment, a first target value is set for distinguish whether an expert who is familiar with adjusting operation (i.e. who has a higher degree of skill) or novice who is unfamiliar with the adjusting operation (i.e. who has a lower degree of skill). The first target value is held in, for example, the screen display item determination part 131. It is to be noted that the first target value is an estimated time that the expert who is familiar with the adjusting operation requires to complete the adjusting operation. In addition, the first target value may be set or adjust at will.

Thus, it is possible to conclude that a person who completes the adjusting operation before an elapse of time defined by the first target value is the expert who has a higher degree of skill in adjusting operation. While, it is possible to conclude that a person who completes the adjusting operation after an elapse of time defined by the first target value is the novice who has a lower degree of skill in adjusting operation. It is to be noted that the time required for the adjusting operation is provided from the clocking result of the clocking part 130.

A description is made as to switching the screens related to the adjusting operation which is performed in view of the determination whether the expert or the novice based on the screen display item determination part 131.

At first, in the adjusting operation, the system control part 133 displays, on the panel part 146, a screen 1 of an adjustment 1 (a screen for an initial adjustment) at indicated by (A) in FIG. 2. On the screen 1, a button for adjustment 1 is provided. At this stage, pressing down the button for adjustment 1 will cause a screen 2 of the adjustment 1 (a screen for the initial adjustment) to appear on the panel part 146 as shown by "B" in FIG. 2 which is indicated by arrow "P".

On the screen 2, there are displaced indication items relating to adjusting Sensor 1 and Sensor 2, and an End button. It is to be noted that the Sensor 1 corresponds, for example, to the detecting sensor 145*a*. In addition, the Sensor 2 corresponds, for example, to the detecting sensor 145*b*. On the screen 2, for example, adjusting sensitivity or the like of each of the Sensor 1 and the Sensor 2 is conducted. In addition, adjusting the Sensor 1 and the Sensor 2 may be performed by manipulating numeric keys or the like which is displayed on, for example, the panel part 146.

At this stage, after adjusting the Sensor 1 and the Sensor 2, for example, when the End button is pressed down that is displayed on the screen 2, the system control part 133 causes a screen 3 of an adjustment 2 (screen for a detailed adjustment) to appear on the panel part 146 as indicated at "C" in FIG. 2. At this time, the clocking part 130 displays, for example, a time that elapses from the display of the screen 1 of the adjustment 1 to the pressing down of the End button on the screen 2 of the adjustment 1.

The screen display item determination part 131 also compares the measuring result of the clocking part 130 to the first target value that is indicated in FIG. 4. If the measuring result of the clocking part 130 is less than the first target value, the screen display item determination part 131 determines that a user is an expert who is familiar with the adjusting operation. Then, the screen display item determination part 131 determines that the number of the adjusting items on the detailed adjustment screen is four (all the adjusting items).

Then, when a button of adjustment 2 is pressed down on the screen 3 as shown at "C" in FIG. 2, the system control part 133 displays, on the panel part 146, a screen 4 of the adjustment 1 as shown at "D" in FIG. 2 which is indicated by an arrow "Q" (detailed adjustment screen). At this stage, the number of the adjusting items that are displayed on the screen is four. More specifically, on the screen 4, for example, there are displayed all of the adjusting items (such as a moving amount and so on) that are related to adjusting the Sensor 1 and that include "Top", "Left", "Right", and "Tail". In addition, an End button is also displayed. As described above, manipulating the numeric keys displayed on the panel part 146 or other place allows for adjusting each of the "Top", "Left", "Right", and "Tail".

In addition, if the measuring result of the clocking part 130 is equal to or larger than the first target value, the screen display item determination part 131 determines that the user is a novice who is unfamiliar with the adjusting operation. Then, the screen display item determination part 131 determines that the number of the adjusting items on the detailed adjustment screen is one (part of the adjusting items). Then, when the button of adjustment 2 is pressed down on the screen 3 as shown at "C" in FIG. 2, the system control part 133 displays, on the panel part 146, a screen 5 (detailed adjustment screen) of the adjustment 2 as shown at "A" in FIG. 3. At this stage, the number of the adjusting items on the screen 5 is one. More specifically, on the screen 5, there is displayed, for example, the "Top" that is part of the adjusting items that are related to the adjustment of the "Sensor 1". Also, an "End" button is displayed.

At this stage, after completion of the adjustment of the "Top", when the "End" button is pressed down, the system control part 133 displays, on the panel part 146, a screen 6 of the adjustment 2 as shown at "B" in FIG. 3 which is indicated by an arrow "R" (detailed adjustment screen). At this stage, the number of the adjusting items displayed on the screen 6 is two. More specifically, on the screen 6, there are displayed, for example, the "Top" and the "Left" that are part of the adjusting items that are related to the adjustment of the "Sensor 1". In addition, an "End" button is displayed. It is to be noted that the "Top" has been already adjusted on the screen 5. Thus, when the "End" button is pressed down after completion of adjusting the "Left" that was unadjusted, the system control part 133 displays, on the panel part 146, a screen 7 of the adjustment 2 as shown at "C" in FIG. 3 which is indicated by an arrow "S" (detailed adjustment screen).

At this stage, the number of the adjusting items displayed on the screen 7 is three. More specifically, on the screen 7, there are displayed, for example, the "Top", the "Left", and the "Right" that are part of the adjusting items that are related to the adjustment of the "Sensor 1". Also, an "End" button is displayed. It is to be noted that the "Top" and the "Left" have been already adjusted on the screens 5 and 6, respectively. Thus, when the "End" button is pressed down after completion of adjusting the "Right" that was unadjusted, the system control part 133 displays, the panel part 146, a screen 8 of the adjustment 2 as shown at "D" in FIG. 3 which is indicated by an arrow "T" (detailed adjustment screen).

At this stage, the number of the adjusting items displayed on the screen 8 is four. More specifically, on the screen 8, there are displayed, for example, the "Top", the "Left", the "Right", and "Tail" that are all of the adjusting items that are related to the adjustment of the "Sensor 1". In addition, an "End" button is displayed. It is to be noted that the "Top", the "Left", and the "Right" have been already adjusted on the screens 5, 6, and 7, respectively. Thus, when the "End" button is pressed down after completion of adjusting the "Tail" that was unadjusted, the system control part 133 terminates the adjusting operation.

Figure 5:
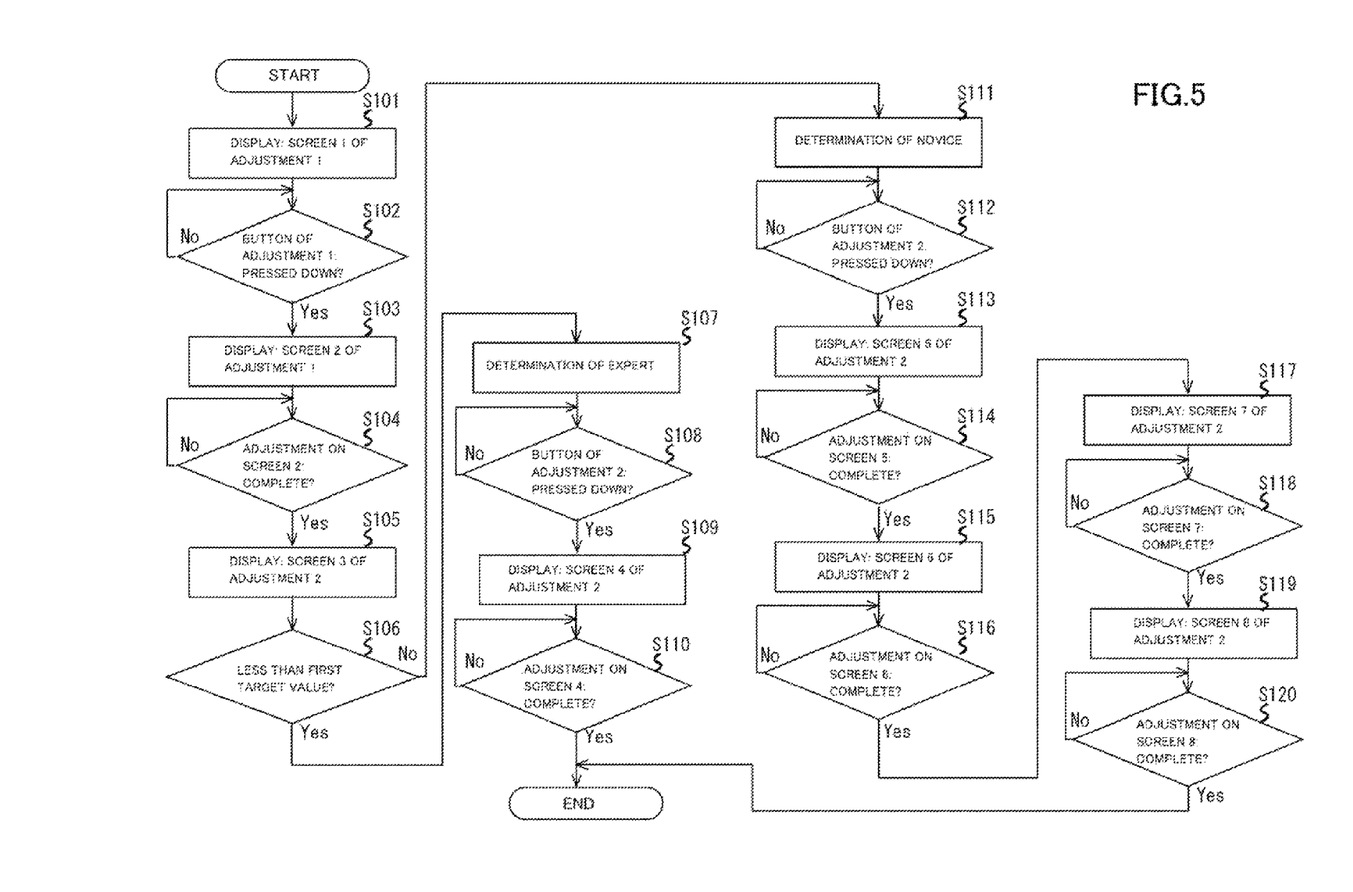
FIG. 5 shows steps of automatic screen switching based on a determination result of the screen display item determination part shown in FIG. 1.
Figure 6:
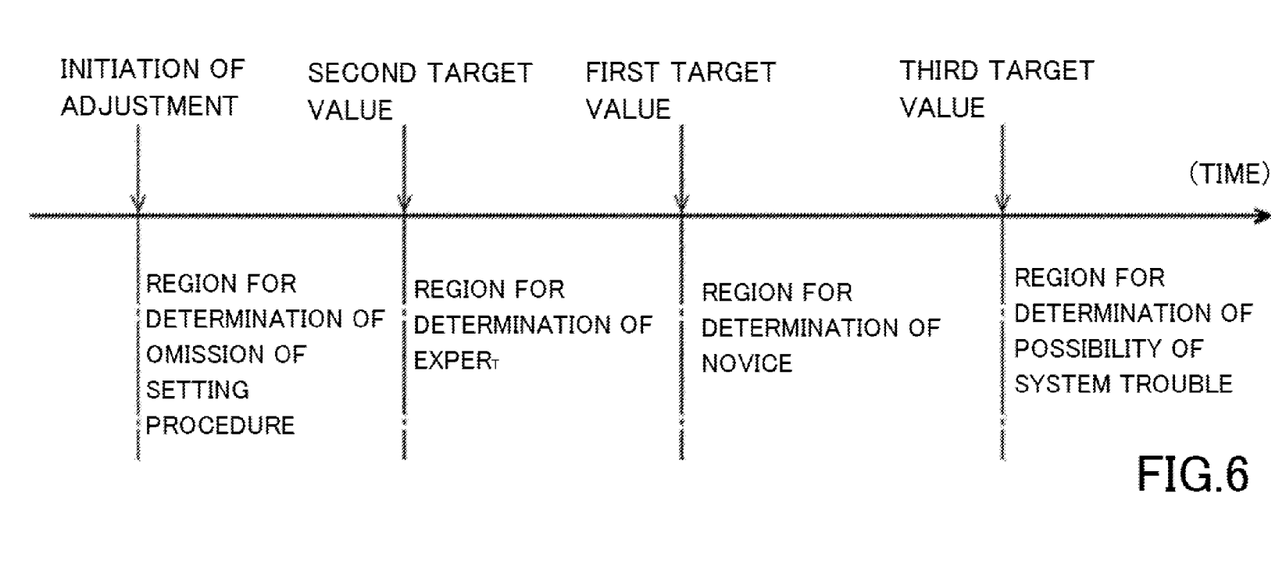
FIG. 6 shows another example of target value that is to be used when the screen display item determination part shown in FIG. 1 determines whether a person in charge of adjusting operation is an expert or a novice.

It is to be noted that even the novice may come to be familiar with the adjusting operation, resulting from the proceedings of the adjustments on FIGS. 5 and 6. More specifically, for example, when the time that requires for the adjustment at "B" in FIG. 3 comes to be less than the first target value that is shown in FIG. 4, the screen display item determination part 131 comes to determine that the user is an expert. At this time, the screen display item determination part 131 determines that the number of the adjusting items displayed on the detailed adjustment screen is four (all the adjusting items). In this case, the screen display item determination part 131 may omit a display on the panel part 146 that is a screen 7 that is shown at "C" in FIG. 3 and instead display, on the panel part 146, a screen 8 that is shown at "D" in FIG. 3 which is indicated by an arrow "U".

In addition, the system control part 133 reads data for screen display, which enables the panel part 146 to display the screens that are shown at "A" to "D" in FIG. 2 and at "A" to "D" in FIG. 3. This data for screen display may be stored in a screen display data storage part such as a HDD (Hard Disk Drive) or other equipment.

It is to be noted that in each of "B", "C", and "D" in FIG. 3, the unadjusted adjusting item(s) is (are) displayed in addition to the adjusted adjusting item(s). However, instead, it is possible to display only the unadjusted adjusting item(s) without displaying the adjusted adjusting item(s).

Next, with reference to FIG. 5, a description is made as to a screen switching based on the determination result of the screen display item determination part 131.

First of all, when the adjusting operation is initiated, the system control part 133 displays, on the panel part 146, the screen 1 of the adjustment 1 (initial adjustment screen) which is shown at "A" in FIG. 2 (Step S101). On the screen 1, as described above, the button of adjustment 1 is displayed. At this time, the button of adjustment 1 is in a condition of waiting for pressing-down (Step S102: No). When the button of adjustment 1 is pressed down (Step S102: Yes), the system control part 133 displays, on the panel part 146, the screen 2 of the adjustment 1 (initial adjustment screen) which is shown at "B" in FIG. 2 (Step S103).

On the screen 2, as described above, there are displayed the adjusting item of the Sensor 1, the adjusting item of the Sensor 2, and the "End" button. After completion of adjusting the Sensor 1 and the Sensor 2, the "End" button is in a condition of waiting for pressing-down (Step S104: No). When the "End" button is pressed down (Step S104: Yes), the system control part 133 displays, on the panel part 146, the screen 3 of the adjustment 2 (detailed adjustment screen) which is shown at "C" in FIG. 2 (Step S105).

At this stage, the clocking part 130 has measure a time elapse from the appearance of the screen 1 of adjustment 1 to the pressing-down of the "End" button on the screen 2 of the adjustment 1. The screen display item determination part 131 compares the measuring result of the clocking part 130 to the first target value that is indicated in FIG. 4. If the measuring result of the clocking part 130 is less than the first target value (Step 106: Yes), the screen display item determination part 131 determines that the user is an expert who is familiar with the adjusting operation (Step S107). Then, the screen display item determination part 131 determines that the number of the adjusting items on the detailed adjustment screen is all the number of the adjusting items.

Then, the button of adjustment 2 is in a waiting condition for being pressed down on the screen 3 as shown at "C" in FIG. 2 (Step S108: No). When the button of adjustment 2 is pressed down (Step S108: Yes), the system control part 133 displays, on the panel part 146, the screen 4 of the adjustment 2 as shown at "D" in FIG. 2 (detailed adjustment screen) (Step S109). As described above, on the screen 4, for example, there are displayed all of the adjusting items, such as moving quantities, that are related to adjusting the Sensor 1 and that include "Top", "Left", "Right" and "Tail", and "End" button.

Here, after completion of the adjustment of each of "Top", "Left", "Right" and "Tail", the "End" button is in a waiting condition for being pressed-down (Step S110: No). When the "End" button is pressed down (Step S110: Yes), the system control part 133 terminates the processing.

On the other hand, in Step S106, when if the measuring result of the clocking part 130 is equal to or larger than the first target value (Step S106: Yes), the screen display item determination part 131 determines that the user is a novice who is unfamiliar with the adjusting operation (Step S111). At this time, the screen display item determination part 131 determines that the number of the adjusting items on the detailed adjustment screen is part of the adjusting items.

Then, the button of adjustment 2 on the screen 3 as shown at "C" in FIG. 2 is in a waiting condition for waiting for being pressed down (Step S112: No). When the button of adjustment 2 is pressed down, the system control part 133 displays, on the panel part 146, the screen 5 (detailed adjustment screen) of the adjustment 2 as shown at "A" in FIG. 3 (Step S113). On the screen 5, there is displayed, for example, the "Top" that is part of the adjusting items that are related to the adjustment of the "Sensor 1", and an "End" button.

At this stage, after completion of the adjustment of the "Top", the "End" button is in a waiting condition for being pressed down (Step 114: No). When the "End" button is pressed down (Step 114: Yes), the system control part 133 displays, on the panel part 146, the screen 6 of the adjustment 2 as shown at "B" in FIG. 3 (Step S115).

On the screen 6, there are displayed, for example, the "Top" and the "Left" that are part of the adjusting items that are related to the adjustment of the "Sensor 1", and an "End" button. It is to be noted that the "Top" has been already adjusted on the screen 5. Thus, the "End" button is in a waiting condition for being pressed down (Step 116: No) after completion of adjusting the "Left" that was unadjusted. When the "End" button is pressed down, the system control part 133 displays, on the panel part 146, the screen 7 of the adjustment 2 (detailed adjustment screen) as shown at "C" in FIG. 3.

On the screen 7, there are displayed, for example, the "Top", the "Left" and the "Right" that are part of the adjusting items that are related to the adjustment of the "Sensor 1", and the "End" button. It is to be noted that the "Top" and the "Left" have been already adjusted on the screens 5 and 6, respectively. Thus, when the "End" button is in a waiting condition for being pressed down after completion of adjusting the "Right" (Step S118: No). When the "End" button is pressed down, the system control part 133 displays, on the panel part 146, the screen 8 of the adjustment 2 (Step S119) as shown at "D" in FIG. 3.

On the screen 8, there are displayed, for example, the "Top", the "Left", the "Right" and "Tail" that are all of the adjusting items that are related to the adjustment of the "Sensor 1", and the "End" button. It is to be noted that the "Top", the "Left", and the "Right" have been already adjusted on the screens 5, 6, and 7, respectively. Thus, the "End" button is in a waiting condition for being pressed down after completion of adjusting the "Tail" (Step S120: No). When the "End" button is pressed down (Step S120: Yes), the system control part 133 terminates the procedure.

In such away, in the present exemplary embodiment, the clocking part 130 measures the adjusting time on the screen 2 of the initial adjustment. Then, the screen display item determination part 131 makes a comparison between the first target value and the measuring result of the clocking part 130 to determine the number to be displayed of the adjusting items. Thereby, the system control part 133 can display, on the panel part 146 as a display part, screens (detailed adjustment screens) 4 to 8 that are different in the number to be displayed of the adjusting items based on data for screen display which corresponds to the number of the adjusting items which is determined by the screen display item determination part 131.

Employing such a procedure allows the screen display item determination part 131 to change the number to be displayed of the adjusting items depending on whether the adjusting operation terminates earlier or later than the first target value. Thereby, no registration of the relation is required between data for image display and the user ID as is seen in a traditional art, which makes it possible to simplify the operation.

More specifically, the screen display item determination part 131 determines, when the adjusting operation completes earlier than the first target value, that the involved operator is an expert who is a high skilled person in adjusting operation. Then, the system control part 133 displays the screen 4 on which all the adjusting items on the panel part 146. Thereby, it is possible for the expert who is highly skillful in adjusting operation to performing the adjusting operation with minimum screen switching operations, resulting in his/her effective adjusting operation.

On the other hand, the screen display item determination part 131 determines, when the adjusting operation completes later than the first target value, that the involved operator is a novice who is an unskilled person in adjusting operation. Then, the system control part 133 displays the screens 5 to 8 each of which displays part of all of the adjusting items. Thereby, it is possible for the novice who is an unskilled person in adjusting operation to precede the adjusting operation while learning a procedure thereof.

Further, in the present exemplary embodiment, it is may be possible to measure the adjusting time in each of the screens 4 to 8 that are different in the displayed number of the adjusting items. In this case, as described above, for even the novice, depending on his/her degree of skill, for example, it is possible to display, on the panel part 146, the screen 8 shown at "D" in FIG. 3 as indicated by the arrow "U". However, in this case, displaying the screen 7 shown at "C" in FIG. 3 on the panel part 146 is omitted.

As to the present exemplary embodiment, it is explained that the screen display item determination part 131 makes a comparison between the first target value and the measuring result of the clocking part 130 to distinguish between the expert who is familiar with the adjusting operation and the novice who is unfamiliar with the adjusting operation, thereby determining the displaying number of the adjusting items. However, not being limited to this example, it may be possible to add second target value and third target value, as shown in FIG. 6, to be compared to the measuring result of the clocking part 130.

More specifically, the second target value is shorter than the first target value in time. In addition, the third target value is longer than the first target value in time. Here, when the measuring result of the clocking part 130 is less than the second target value, the screen display item determination part 131 determines that there is an omission in the adjusting operation. More specifically, the screen display item determination part 131 determines that the measured time of the adjusting operation is inadequate. In such a case, the system control part 133 displays, on the panel part 146, an alarm or warning.

As described above, the first target value is an expected time that is required to complete the adjusting operation for the expert who is familiar with the adjusting operation. For this reason, when the measuring result of the clocking part 130 is less than the second value that is shorter than the first target value, it is possible to conclude that there is an omission in the adjusting operation.

In addition, when the measuring result of the clocking part 130 is equal to or longer than the third value, the screen display item determination part 131 determines an occurrence of a system trouble. More specifically, the screen display item determination part 131 determines that the measured time of the adjusting operation is inadequate. In such a case, the system control part 133 also displays, on the panel part 146, an alarm or warning.

More specifically, the third target value is an expected time that is required to complete the adjusting operation for the novice who is unfamiliar with the adjusting operation. Thus, when the measuring result of the clocking part 130 is equal to or longer than the third target value, it is possible to conclude that a system trouble occurs.

As detailed above, according to the electronic device and operation procedure indicating method both of which are embodying of the present disclosure, the clocking part measures the adjusting operation time on the initial adjustment screen, and then the screen display item determination part makes the comparison between the first target value and the measuring result of the clocking part to determine the displaying number of the adjusting items. By doing so, the system control part will displays, on the panel part 146, the screen based on the screen display data corresponding to the displaying number of the adjusting items that has been determined by the screen display item determination part.

By doing so, the screen display item determination part makes it possible to change the displaying number of the adjusting items on the detailed adjustment screen depending on whether the adjusting operation complete earlier or later than the first target value. Thereby, no registration is required for relating the image display data and the user ID as seen in a typical electronic device, thereby simplifying the operation.

In summary, assuming that such an automatic screen changing in the typical electronic device is applied to an operator conducted adjusting operation of electronic parts mounting on the control device in the production line or to a maintenance operation for the image forming device by a field service engineer. Then, a registration is required for relating the image display data and the user ID for each of the operators and field service engineers. As a result, conducting the adjusting operation or maintenance operation becomes cumbersome.

In view of such circumstances, the present disclosure is proposed. According to the present disclosure, the clocking part measures the adjusting operation time on the initial adjustment screen, and then the screen display item determination part makes the comparison between the first target value and the measuring result of the clocking part to determine the displaying number of the adjusting items. By doing so, the system control part will displays, on the panel part 146, the screen based on the screen display data corresponding to the displaying number of adjusting items that has been determined by the screen display item determination part. Thereby, the screen display item determination part makes it possible to change the displaying number of the adjusting items on the detailed adjustment screen depending on whether the adjusting operation complete earlier or later than the first target value. Thereby, no registration is required for relating the image display data and the user ID as seen in a typical electronic device, thereby simplifying the operation.

It is to be noted that the present disclosure is not limited to the exemplary embodiments and therefore manifestly it is capable of any modification without departing from the basic concept of the present disclosure. For example, the description is made that the exemplary embodiments are applied to adjustments of the paper detecting sensor 144 and the detecting sensors 145a to 145c. However, instead, the present disclosure is applicable to an adjustment of CCD (Charge Coupled Device) image sensors or the like that are mounted on the scanner part 140.

In addition, in the description of the exemplary embodiments, the MFP 100 is used an example of the object of the adjusting operation. However, not limited to this example, the present disclosure is applicable to adjusting other adjustment-required electronic devices that include, for example, a control device in a production line, an ATM (Automated Teller Machine), and a ticket vending machine.

What is claimed is:

1. An electronic device comprising:
   a screen display data storage circuit including a region in which is stored screen display data for displaying an initial adjustment screen and plural detailed adjustment screens, the plural detailed adjustment screens being different from each other such that each of the plural detailed adjustment screens displays a different number of adjusting items compared to the other detailed adjustment screens of the plural detailed adjustment screens;
   a display circuit including a display panel to display a screen based on the screen display data;
   a clocking circuit that performs measuring an adjusting time on the initial adjustment screen;
   a screen display item determination circuit that performs comparing a first target value to a measuring result of the clocking circuit in order to determine the displaying number of the adjusting items; and
   a system control circuit that performs displaying, on the display circuit, one of the detailed adjustment screens based on the screen display data corresponding to the number of the adjusting items that is determined by the screen display item determination circuit.

2. The electronic device according to claim 1, wherein the screen display item determination circuit performs:
   determining that the displaying number of the adjusting items of a detailed adjustment screen is all of numbers of the adjusting items when the measuring result is less than the first target value; and
   determining that the displaying number of the adjusting items of the detailed adjustment screen is part of the number of the adjusting items when the measuring result is equal to or larger than the first target value.

3. The electronic device according to claim 2, wherein the clocking circuit performs:
   measuring an adjusting time on each of the detailed adjustment screens; and
   determining that the displaying number of next detailed adjustment screen is all of numbers of the adjusting items when the measuring result is less than the first target value in either one of the detailed adjustment screens.

4. The electronic device according to claim 2, wherein the screen display item determination circuit performs determining that the adjusting time is inadequate when the measuring result is less than a second target value that is shorter than the first target value or when the measuring result is equal to or larger than a third target value that is longer than the first target value, and the system control circuit performs, on the display circuit, displaying an alarm based on a determination result of the screen display item determination circuit.

5. A method of displaying an operation procedure, comprising:
   storing, in a screen display data storage circuit, screen display data for displaying an initial adjustment screen and plural detailed adjustment screens, the plural detailed adjustment screens being different from each other such that each of the plural detailed adjustment screens displays a different number of adjusting items compared to the other detailed adjustment screens of the plural detailed adjustment screens;
   displaying, on a display circuit, a screen based on the screen display data;
   measuring, via a clocking circuit, an adjusting time on the initial adjustment screen;
   comparing, via a screen display item determination circuit, a first target value to a measuring result of the clocking circuit in order to determine the displaying number of the adjusting items; and
   displaying, via a system control circuit, on the display circuit, one of the detailed adjustment screens based on the screen display data corresponding to the number of the adjusting items that is determined by the screen display item determination circuit.

* * * * *